United States Patent
Tandy et al.

(10) Patent No.: US 12,427,716 B2
(45) Date of Patent: Sep. 30, 2025

(54) THREE-DIMENSIONAL PRINTING WITH CELLULOSE-BASED ADDITIVES

(71) Applicant: PERIDOT PRINT LLC, Palo Alto, CA (US)

(72) Inventors: Jesiska Tandy, San Diego, CA (US); Emre Hiro Discekici, San Diego, CA (US); Ali Emamjomeh, Sant Cugat del Valles (ES); Alay Yemane, San Diego, CA (US); Rachael Donovan, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 248 days.

(21) Appl. No.: 17/637,475

(22) PCT Filed: Oct. 15, 2019

(86) PCT No.: PCT/US2019/056330
§ 371 (c)(1),
(2) Date: Feb. 23, 2022

(87) PCT Pub. No.: WO2021/076109
PCT Pub. Date: Apr. 22, 2021

(65) Prior Publication Data
US 2022/0274328 A1    Sep. 1, 2022

(51) Int. Cl.
*B29C 64/165* (2017.01)
*B29C 64/314* (2017.01)
(Continued)

(52) U.S. Cl.
CPC ......... *B29C 64/165* (2017.08); *B29C 64/314* (2017.08); *B33Y 10/00* (2014.12);
(Continued)

(58) Field of Classification Search
None
See application file for complete search history.

(56) References Cited

U.S. PATENT DOCUMENTS

| | | | |
|---|---|---|---|
| 2017/0226692 A1* | 8/2017 | Zhu | D21B 1/06 |
| 2018/0126631 A1* | 5/2018 | Nauka | B33Y 70/10 |
| 2019/0055697 A1 | 2/2019 | Sakai et al. | |

FOREIGN PATENT DOCUMENTS

| | | | |
|---|---|---|---|
| KR | 10-2018-0048842 A | | 5/2018 |
| WO | WO 2017/180166 | * | 10/2017 |

(Continued)

OTHER PUBLICATIONS

English Translation of Funabiki et al. (TW 2017/37889). (Year: 2017).*

(Continued)

*Primary Examiner* — Ronak C Patel
(74) *Attorney, Agent, or Firm* — Dierker & Kavanaugh, P.C.

(57) ABSTRACT

Three-dimensional printing kits can include a powder bed material and a fusing agent to selectively apply to the powder bed material. The powder bed material can include polymer build particles and cellulose particles. The cellulose particles can be chemically and thermally stable at a melting point temperature of the polymer build particles. The fusing agent can include water and a radiation absorber to absorb radiation energy and convert the radiation energy to heat.

14 Claims, 6 Drawing Sheets

(51) Int. Cl.
    *B33Y 10/00*     (2015.01)
    *B33Y 30/00*     (2015.01)
    *B33Y 40/10*     (2020.01)
    *B33Y 70/00*     (2020.01)
    *B29K 77/00*     (2006.01)
    *B29K 105/00*     (2006.01)
    *B29K 105/16*     (2006.01)
    *B29K 401/00*     (2006.01)

(52) U.S. Cl.
    CPC ............... *B33Y 30/00* (2014.12); *B33Y 40/10* (2020.01); *B33Y 70/00* (2014.12); *B29K 2077/00* (2013.01); *B29K 2105/0085* (2013.01); *B29K 2105/162* (2013.01); *B29K 2401/00* (2013.01); *B29K 2995/0097* (2013.01)

(56) References Cited

FOREIGN PATENT DOCUMENTS

| WO | 2017/194147 A1 | 11/2017 |
| WO | 2018/122734 A1 | 7/2018 |
| WO | 2018/199998 A1 | 11/2018 |

OTHER PUBLICATIONS

English Translation of Brendle et al. (WO 2010/043397) (Year: 2010).*
Cataldi, A., et al. "Polyvinyl alcohol reinforced with crystalline nanocellulose for 3D printing application," Materials Today Communications, vol. 15, Mar. 15, 2018, pp. 236-244.
Li, V. C., et al., "Cellulose nanocrystals support material for 3D printing complexly shaped structures via multi-materials-multi-methods printing," Additive Manufacturing, vol. 28, Aug. 2019, pp. 14-22.
Rahimi, S. K., et al., "Polyamide 6 nanocomposites incorporating cellulose nanocrystals prepared by in situ ring-opening polymerization: Viscoelasticity, creep behavior, and melt rheological properties," Polymer Engineering and Science, vol. 56, Issue 9, Apr. 21, 2016, 16 pages.
Scott, Clare, "New 3D Printing Materials Uses Cellulose for Sustainability and Quality," 3dprint, 3D printing materials, retrieved at https://3dprint.com/210276/cellulose-3d-printing-material/, Apr. 16, 2018, 4 pages.
Wang, Q., et al. "3D printing with cellulose materials," Cellulose, vol. 25, Issue 8, 2018, pp. 4275-4301.
Zhu, J. H., et al. "Bio-Based Polyamides Reinforced with Cellulose Nanofibers-Processing and Characterization," SPE ACCE, Sep. 2015, pp. 16 pages.

* cited by examiner

THREE-DIMENSIONAL PRINTING WITH CELLULOSE-BASED ADDITIVES

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. In general, three-dimensional printing technology can shorten the product development cycle by allowing rapid creation of prototype models for reviewing and testing. In some respects, three-dimensional printing has been somewhat limited with respect to commercial production capabilities because the range of materials used in three-dimensional printing is likewise limited. Nevertheless, several commercial sectors such as aviation and the medical industry have benefitted from the ability to rapidly prototype and customize parts for customers.

DETAILED DESCRIPTION

The present disclosure describes three-dimensional printing kits, methods, and systems that can be used for three-dimensional printing with cellulose particles. Three-dimensional (3D) printing processes, such as polymer-based multi-jet fusion (MJF) printing, can be used to produce three-dimensional objects. The three-dimensional printed object may have mechanical properties related to powder bed material choice, but in accordance with the present disclosure, those mechanical properties can be modified though the use of an additive that may enhance object stiffness. For example, the present technology can include the use of cellulose particles combined with polymer build particles to form a blended powder bed material which may provide increased stiffness of the three-dimensional printed objects formed therefrom.

In one example, a three-dimensional printing kit includes a powder bed material comprising polymer build particles and cellulose particles. The cellulose particles are chemically and thermally stable at a melting point temperature of the polymer build particles. The three-dimensional printing kit also includes a fusing agent to selectively apply to the powder bed material. The fusing agent includes water and a radiation absorber to absorb radiation energy and convert the radiation energy to heat. The cellulose particles can be ultrafine cellulose particles an average aspect size of about 1:1 to about 10:1 and a D50 particle size of about 500 nm to about 5 μm. The cellulose particles can be cellulose nanocrystals particles having an average aspect size of about 2:1 to about 500:1 and a D50 particle size of about 10 nm to about 1 μm. The polymer build particles can have an average aspect ratio of 1:1 to about 1.5:1 and a D50 particle size from about 5 μm to about 150 μm. The polymer build particles can include a polyamide co-polymer. The polymer build particles can be present in the powder bed material at an amount from about 60 wt % to about 97 wt % based on the total weight of the powder bed material, and wherein the cellulose particles can be present in the powder bed material in an amount from about 1 wt % to about 40 wt % based on the total weight of the powder bed material. The cellulose particles can be present in the powder bed material in an amount from about 3 wt % to about 20 wt % based on the total weight of the powder bed material. The melting point temperature of the polymer build particles can be from about 70° C. to about 350° C. The radiation absorber can be a metal dithiolene complex, carbon black, a near-infrared absorbing dye, a near-infrared absorbing pigment, metal nanoparticles, a conjugated polymer, or a combination thereof. The polymer build particles can include polyamide 6, polyamide 9, polyamide 11, multipurpose polyamide 12 (MP PA-12), polyamide 66, polyamide 612, thermoplastic polyamide (TPA), polyamide copolymer, polyethylene, thermoplastic polyurethane, polypropylene, polyester, polycarbonate, polyether ketone, polyacrylate, polystyrene, wax, or a combination thereof. The three-dimensional printing kit can include a detailing agent that can include a detailing compound, wherein the detailing compound can reduce the temperature of powder bed material onto which the detailing agent is applied.

The present disclosure also describes methods of making three-dimensional printed objects. In one example, a method of making a three-dimensional printed object includes iteratively applying individual layers of a powder bed material to a powder bed, wherein the powder bed material includes polymer build particles and cellulose particles, wherein the cellulose particles are chemically and thermally stable at a melting point temperature of the polymer build particles. The method further includes, based on a three-dimensional object model, selectively applying a fusing agent onto the individual layers of powder bed material, wherein the fusing agent includes water and a radiation absorber, wherein the radiation absorber absorbs radiation energy and converts the radiation energy to heat. The method further includes, exposing the powder bed to radiation energy to selectively fuse the polymer build particles in contact with the radiation absorber at individual layers and thereby form the three-dimensional printed object. The method can further include, blending the powder bed material by mixing the polymer build particles with the cellulose particles using an acoustic mixer.

The present disclosure also describes systems for three-dimensional printing. In one example, a system for three-dimensional printing includes a powder bed material including polymer build particles and cellulose particles, wherein the cellulose particles are chemically and thermally stable at a melting point temperature of the polymer build particles. The system further includes a fusing agent to be applied onto a layer of the powder bed material, wherein the fusing agent includes water and a radiation absorber, wherein the radiation absorber is to absorb radiation energy and convert the radiation energy to heat. The system further includes a radiant energy source positioned to expose the layer of powder bed material to radiation energy to selectively fuse the polymer build particles in contact with the radiation absorber and thereby form a three-dimensional printed object. The system can also include the cellulose particles include ultrafine cellulose particles, cellulose nanocrystals particles, or a combination thereof.

The three-dimensional printing kits, methods, and systems described herein can be used to make three-dimensional (3D) printed objects having enhanced stiffness properties. For example, a three-dimensional object printed that is printed using the present technology can have an increased Young's modulus with respect to stiffness compared to a three-dimensional printed object that is printed without the cellulose particles of the present technology. This can be useful for different types of three-dimensional printed objects in which an increased stiffness is desirable. The cellulose particles can be naturally derived which makes the cellulose particles renewable and therefore a safer and cheaper alternative to fillers such as glass beads or high aspect ratio glass fibers.

As mentioned above, cellulose particles can be included in the powder bed material used in the three-dimensional printing process. The three-dimensional printing processes described herein can include applying a fusing agent to a powder bed material that includes polymer build particles and the cellulose particles. The fusing agent can include a radiation absorber, which can be a compound or material that absorbs radiation energy (such as UV or infrared radiation) and converts the energy to heat. After applying the fusing agent, and radiation source is used to irradiate the powder bed. The areas of the powder bed where the fusing agent was applied can be selectively heated to a melting or softening point temperature of the polymer build particles so that the polymer build particles fuse together to form a solid layer of the final three-dimensional printed object.

Three-Dimensional Printing Kits

In one example, a three-dimensional printing kit can include materials for three-dimensional printing objects having cellulose particle reinforcement. These three-dimensional printing kits can include a powder bed material including polymer build particles and cellulose particles and a fusing agent that includes a radiation absorber to absorb radiation energy and convert the radiation energy to heat. The cellulose particles can be chemically and thermally stable at a melting point temperature of the polymer build particles.

Figure 1:
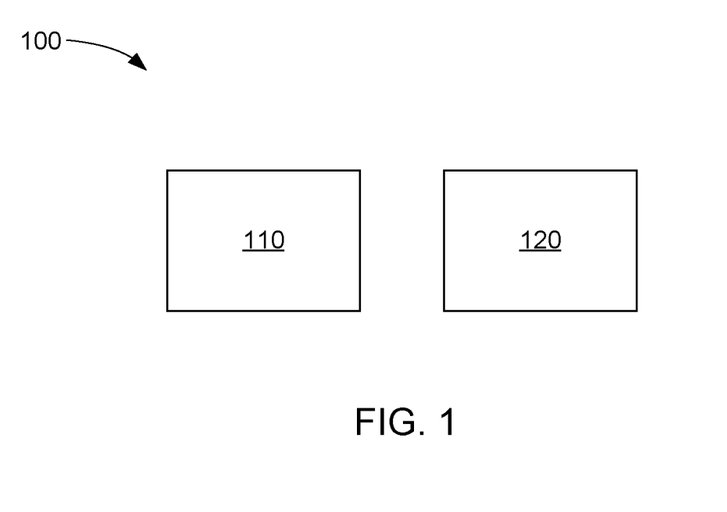
FIG. 1 is a schematic view of an example three-dimensional printing kit in accordance with the present disclosure.

FIG. 1 is a schematic of an example three-dimensional printing kit 100. This three-dimensional printing kit includes a powder bed material 110 and a fusing agent 120. The powder bed material can include polymer build particles such as polymer build particles and cellulose particles that are chemically and thermally stable at a melting point temperature of the polymer build particles. The fusing agent can be selectively applied to the powder bed material. The fusing agent can include water and a radiation absorber. The radiation absorber can absorb radiation energy and convert the radiation energy to heat.

As used herein, "chemically stable" and "thermally stable" can be used with reference to the cellulose particles to describe cellulose particles that do not chemically or physically decompose or react to form different chemical compounds when heated to the melting point temperature of the polymer build particles; or if the cellulose particles begin to decompose or react at the melting point temperature, the decomposition or reaction can be sufficiently slow that less than 10 wt % of the cellulose particles decompose or react while the polymer build particles are being fused together. In some examples, the cellulose particles can be a solid at room temperature and can have a melting point temperature that is greater than the melting point temperature of the polymer build particles. For example, the melting point of the cellulose particles can be from about 10° C. to about 200° C. greater than the melting point temperature of the polymer build particles, or can be from about 20° C. to about 100° C. greater than the melting point temperature of the polymer build particles.

As used herein, "cellulose particles" can be used with reference to particles that are organic and insoluble in water and can be a polysaccharide, such as a polysaccharide including a linear chain of about 200 to about 5,000 (or more) β linked D-glucose units. A formulation for cellulose may include a structure with $(C_6H_{10}O_5)_n$, where n is from 200 to 5,000, for example. There may be other groups present along the cellulose chain, depending on the type of cellulose, for example. Cellulose is found in cell walls of green plants, algae, oomycetes, and other similar plant-structures. As mentioned, the cellulose particles can be included as an additive in the powder bed material to promote an increase the stiffness of a three-dimensional printed object that is printed with cellulose particles as compared to a three-dimensional printed object that is printed without the cellulose particles.

Figure 2:
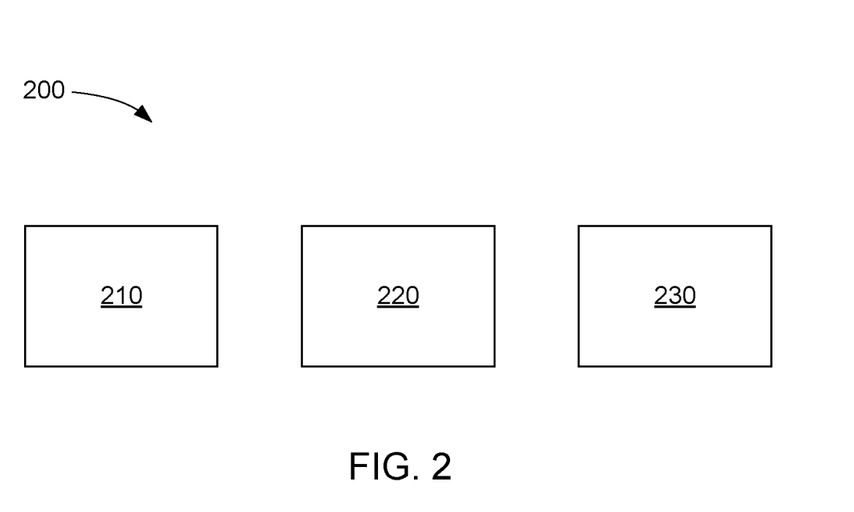
FIG. 2 is a schematic view of another example three-dimensional printing kit in accordance with the present disclosure.

Another example is shown in FIG. 2, which includes an alternative three-dimensional printing kit 200. The three-dimensional printing kit can include a powder bed material 210, a fusing agent 220, and a detailing agent 230. The powder bed material and the fusing agent can be as described in relation to FIG. 1. The detailing agent can include a detailing compound that is applied to the powder bed material at boundary areas surrounding the three-dimensional object being printed to reduce the temperature of powder bed material onto which the detailing agent is applied. By reducing the temperature at these locations, often a sharper or cleaner boundary can be generated that defines the three-dimensional object. There are other locations that detailing agent can be applied for purposes of cooling as well.

Figure 3A:
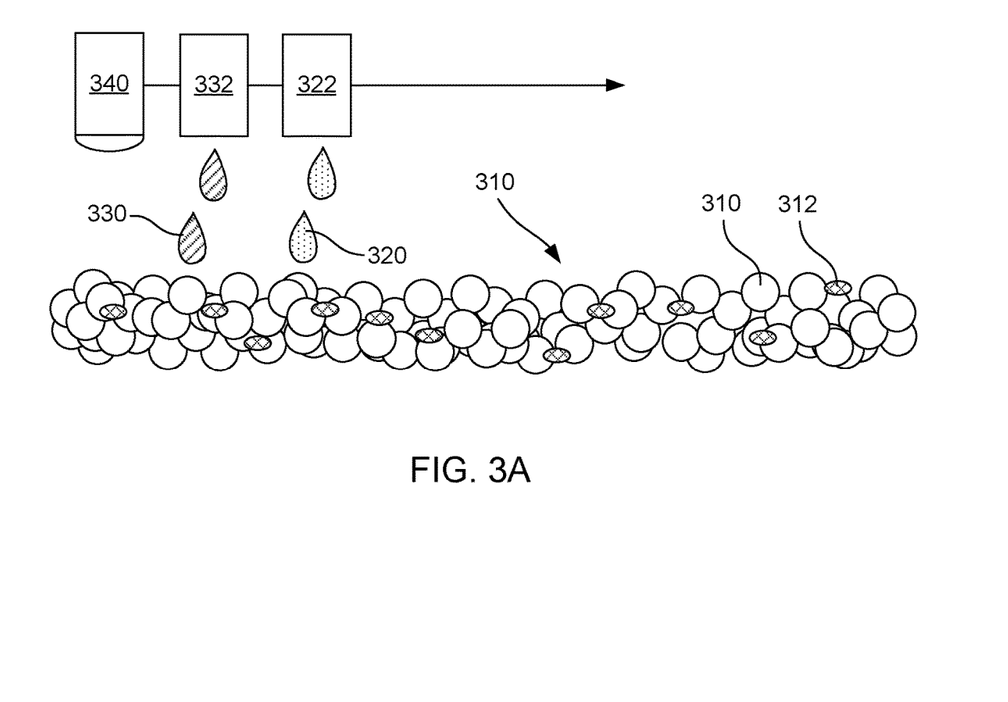
FIGS. 3A-3C show a schematic view of an example three-dimensional printing process using an example three-dimensional printing kit in accordance with the present disclosure.
Figure 3B:
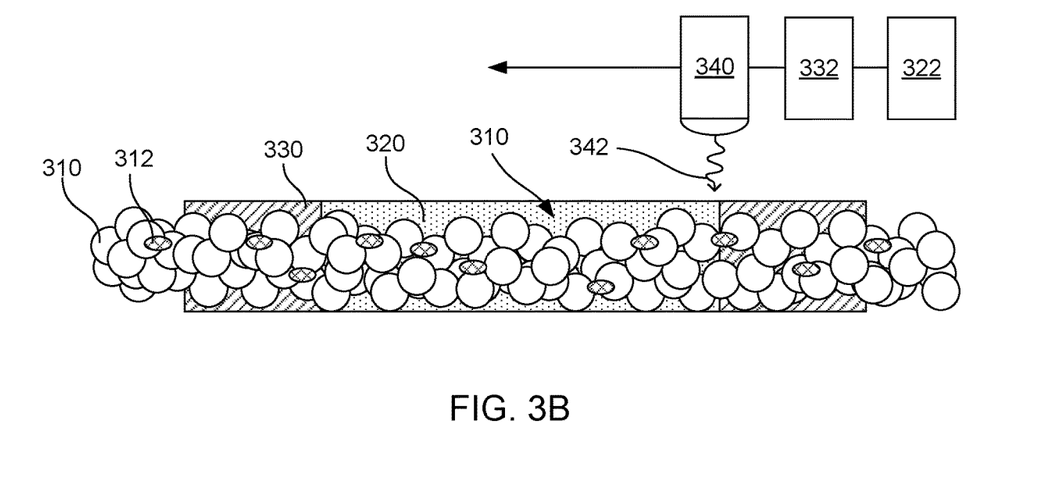
Figure 3C:
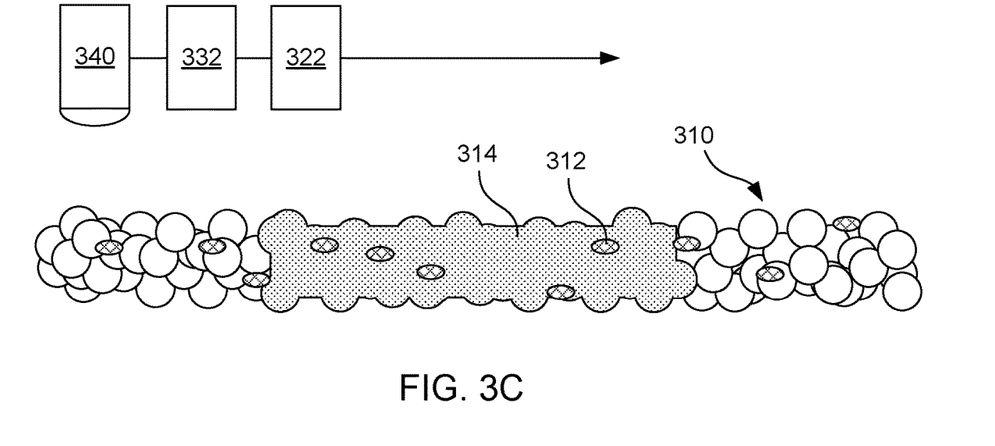

FIGS. 3A-3C illustrate an example of using the three-dimensional printing kits to form a three-dimensional printed object. In FIG. 3A, a fusing agent 320 jetted onto a layer of powder bed material made up of polymer build particles 310 and cellulose particles 312 mixed with the polymer build particles. The fusing agent is jetted from a fusing agent ejector 322. In one example, and as shown in this FIG., a detailing agent 330 may also be used which can be jetted from a detailing agent ejector 332. These fluid ejectors can move across the layer of powder bed material to selectively jet fusing agent on areas that are to be fused, while the detailing agent (if used) can be jetted onto areas that are to be cooled. In some cases, the detailing agent can be jetted around edges of the area where the fusing agent was jetted to prevent the surrounding powder bed material from caking. In other examples, the detailing agent can be jetted onto a portion of the same area where the fusing agent was jetted to prevent overheating of the powder bed material. A radiation source 340 can also move across the layer of powder bed material. Alternatively, the radiation source can be a fixed position source that irradiates the powder be material on a layer-by-layer basis.

FIG. 3B shows the layer of powder bed material 310 after the fusing agent 320 has been jetted onto an area of the layer that is to be fused. Additionally, in this example, the detailing agent 330 has been jetted onto areas of the powder bed adjacent to edges of the area where the fusing agent was jetted. In this figure, the radiation source 340 is shown emitting radiation 342 toward the layer of polymer build particles 310 and cellulose particles 312. The fusing agent can include a radiation absorber that can absorb this radiation and convert the radiation energy to heat.

FIG. 3C shows the layer of powder bed material 310 with a fused portion 314 where the fusing agent was jetted. This portion has reached a sufficient temperature to fuse the polymer build particles together to form a solid polymer matrix. The fused portion has cellulose particles 312 trapped within which can impart additional stiffness to the final three-dimensional printed object. The area where the detailing agent was jetted remains as loose powder. In this example, the detailing agent evaporates to evaporatively cool the polymer build particles, which can help produce a well-defined edge of the fused layer by reducing partially fused or caked powder particles around the edges.

Powder Bed Materials

As mentioned, the powder bed material can include polymer build particles and cellulose particles. For additional clarity and in accordance with examples herein, the term "powder build material" refers to the particulate composition formulation blend that can be applied to a build platform or a powder bed for three-dimensional printing. The powder bed material is used to make up the bulk of the printed object, and in accordance with the present disclosure, includes two types of particles: polymer build particles and cellulose particles. Other types of additives may or may not also be included. Thus, in a typical example, the polymer build particles of the powder build material can become heat fused together at locations where fusing agent is applied and corresponding electromagnetic energy is used to energize an electromagnetic radiation absorber present in the fusing agent, thus forming a thermally fused three-dimensional object. Furthermore, in examples herein, the cellulose particles that are also included in the powder bed material as an additive may not become melted or heat fused in the way that the polymer particles are fused together, but the cellulose particles can become entrapped or composited into the three-dimensional part matrix with the polymer, which can enhance stiffness of the three-dimensional printed object.

In certain examples, the powder bed material can include polymer build particles or polymer build particles having a variety of shapes, such as substantially spherical particles or irregularly-shaped particles. In some examples, the powder bed material can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The powder bed material can form layers from about 20 μm to about 100 μm thick, allowing the fused layers of the printed part to have roughly the same thickness. This can provide a resolution in the z-axis (i.e., depth) direction of about 20 μm to about 100 μm. The powder bed material can also have a sufficiently small particle size and sufficiently regular particle shape to provide about 20 μm to about 100 μm resolution along the x-axis and y-axis (i.e., the axes parallel to the top surface of the powder bed). For example, the polymer build particles in particular can have a d50 particle size from about 20 μm to about 100 μm. In other examples, the d50 particle size can be from about 20 μm to about 50 μm. Other resolutions along these axes can be from about 30 μm to about 90 μm or from about 40 μm to about 80 μm.

The polymer build particles can have a melting or softening point from about 70° C. to about 350° C. In further examples, the polymer build particles can have a melting or softening point from about 150° C. to about 200° C. A variety of thermoplastic polymers with melting points or softening points in these ranges can be used. For example, the polymer build particles can include polymers such as polyamide 6, polyamide 9, polyamide 11, polyamide 12, polyamide 6,6, polyamide 6,12, thermoplastic polyamide, polyamide copolymer, polyethylene, wax, thermoplastic polyurethane, acrylonitrile butadiene styrene, amorphous polyamide, polymethylmethacrylate, ethylene-vinyl acetate, polyacrylate, silicone rubber, polypropylene, polyester, polycarbonate, copolymers of polycarbonate with acrylonitrile butadiene styrene, copolymers of polycarbonate with polyethylene terephthalate polyether ketone, polyacrylate, polystyrene, or a mixture, copolymer, or blend thereof. In a specific example, the polymer build particles can include polyamide 12 polymer, which can have a melting point from about 175° C. to about 200° C. In another specific example, the polymer build particles can be a polyamide copolymer.

As mentioned, the powder bed material can also include cellulose particles. Example cellulose particles that can be used include ultrafine cellulose (UFC) particles, nanocellulose particles which is often referred to as cellulose nanocrystal(s) (CNC) particles, or a combination thereof. The particle size of the UFC particles can be on the order of about a half of a micron to about 5 microns. For example, UFC particles can have an average aspect size of about 1:1 to about 10:1, about 1:1 to about 1:5, about 1:1 to about 1:2, about 1:1 to about 1.5, about 1.5 to about 1:10, about 2:1 to about 8:1, or about 3:1 to about 5:1. The UFC particles can have a D50 particle size of about 500 nm to about 5 μm, about 1 μm to about 4 μm, or about 2 μm to about 3 μm. Particle sizes having a low aspect ratio, e.g., about 1:1 to about 1.5:1, can be based on the equivalent spherical volume of the particles. For example, D50 particle size can be measured by laser diffraction, microscope imaging, or other suitable methodology, but in some examples, the particle size (or particle size distribution) can be measure and/or characterized using a Malvern™ Mastersizer™. This tool considers particles sizes based on diameter of a sphere, so that elongated or rod-shaped particles are reported based on their equivalent spherical volume.

The particle size of the CNC particles can have D50 particle sizes from about 10 nm to about 1 μm, about 50 nm to about 750 nm, or about 100 nm to about 500 nm. D50 particle sizes can be measured as described above in relation to the UFC particle sizes. Furthermore, these particles can also have relatively high aspect ratios. An average aspect ratio of the CNC particles can be from about 2:1 to about 500:1, about 10:1 to about 300:1, or about 50:1 to about 100:1.

In various examples, the amount of cellulose particles added to the powder bed material can be selected to provide enhanced stiffness to resulting three-dimensional printed objects without interfering with the three-dimensional printing process or the properties of the final three-dimensional printed object. In some examples, the cellulose particles can be present in the powder bed material in an amount from about 0.05 wt % to about 40 wt %, about 1 wt % to about 40 wt %, or about 3 wt % to about 20 wt %, based on the total weight of the powder bed material. In addition, the polymer build particles can be present in the powder bed material at an amount from about 60 wt % to about 99 wt %, about 60 wt % to about 97 wt %, or about 70 wt % to about 80 wt %, based on the total weight of the powder bed material.

The cellulose particles can be incorporated into the powder bed material by mixing the cellulose particles with polymer build particles. In some examples, the cellulose particles can be a solid powder and the cellulose particles can be dry blended with the polymer build particles, such that the cellulose particles can be uniformly incorporated into the polymer build particles. For example, the cellulose particles can be dry blended with the polymer build particles using an acoustic mixer. In other examples, the cellulose particles can be in the form of a liquid dispersion that can be blended with the polymer build particles. The mixture can then be dried to produce a dry powder bed material. The cellulose dispersion (liquid), on the other hand, can be mixed with the polymer build particles in a sufficiently small amount that the powder bed material is still flowable similar to a dry powder. In still further examples, the cellulose particles can be incorporated into the polymer build particles at the time of manufacturing the polymer build particles. The cellulose particles can be added during the polymerization process or mixed into a molten polymer before the polymer is formed into particles, in various examples.

The powder bed material can also, in some cases, include a filler in addition the cellulose particles. The filler can include inorganic particles such as alumina, silica, fibers, carbon nanotubes, or combinations thereof. When the thermoplastic or other polymer build particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer build particles to filler particles can be from about 100:1 to about 1:2 or from about 5:1 to about 1:1.

Fusing Agents

The multi-fluid kits and three-dimensional printing kits described herein can include a fusing agent to be applied to the powder bed material. The fusing agent can include a radiation absorber that can absorb radiant electromagnetic energy and convert the energy to heat. The "radiation absorber" in examples of the present disclosure, thus likewise can be referred to as an electromagnetic radiation absorber, as they may absorb radiant electromagnetic energy and convert that energy into heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer build particles in contact with the radiation absorber. An appropriate amount of radiant energy can be applied so that the area of the powder bed material that was printed with the fusing agent heats up enough to melt the polymer build particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. Generally, the print mode can include any variables or parameters that can be controlled during three-dimensional printing to affect the outcome of the three-dimensional printing process.

Generally, the process of forming a single layer by applying fusing agent and irradiating the powder bed can be repeated with additional layers of powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the powder bed material, the amount of radiation absorber in the powder bed material can be from about 0.0003 wt % to about 10 wt %, or from about 0.005 wt % to about 5 wt %, with respect to the weight of the powder bed material.

In some examples, the fusing agent can be jetted onto the powder bed material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, Nuosept™

(Nudex, Inc., New Jersey), Ucarcide™ (Union carbide Corp., Texas), Vancide™ (R.T. Vanderbilt Co., Connecticut), Proxel™ (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer build particles. Depending on the type of polymer build particles used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Making Three-Dimensional Printed Objects

Figure 4:
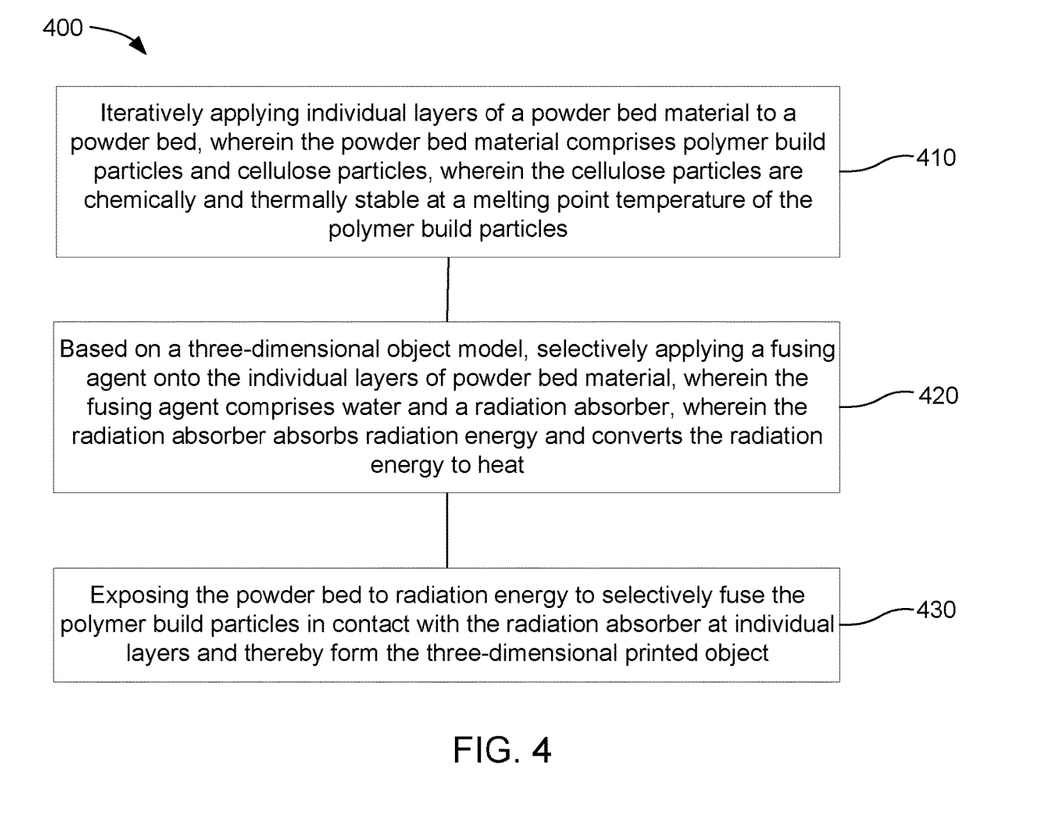
FIG. 4 is a flowchart illustrating an example method of making a three-dimensional printed object in accordance with examples of the present disclosure.

The present disclosure also includes methods of making three-dimensional printed objects. FIG. 4 shows a flowchart illustrating one example method 400 of making a three-dimensional printed object. The method includes iteratively applying 410 individual layers of a powder bed material to a powder bed, wherein the powder bed material includes polymer build particles and cellulose particles, wherein the cellulose particles are chemically and thermally stable at a melting point temperature of the polymer build particles. The method can further include, based on a three-dimensional object model, selectively applying 420 a fusing agent onto the individual layers of powder bed material, wherein the fusing agent includes water and a radiation absorber, wherein the radiation absorber absorbs radiation energy and converts the radiation energy to heat. In further detail, the method can include exposing 430 the powder bed to radiation energy to selectively fuse the polymer build particles in contact with the radiation absorber at individual layers and thereby form the three-dimensional printed object. The method can also include blending the powder bed material by mixing the polymer build particles with the cellulose particles using an acoustic mixer in one example. The powder bed material and fusing agent can have any of the ingredients and properties described above.

In some examples, a detailing agent can also be jetted onto the powder bed. As described above, the detailing agent can be a fluid that reduces the maximum temperature of the powder bed material on which the detailing agent is printed. In particular, the maximum temperature reached by the powder during exposure to electromagnetic energy can be less in the areas where the detailing agent is applied. In certain examples, the detailing agent can include a solvent that evaporates from the powder bed material to evaporatively cool the powder bed material. The detailing agent can be printed in areas of the powder bed where fusing is not desired. In particular examples, the detailing agent can be printed along the edges of areas where the fusing agent is printed. This can give the fused layer a clean, defined edge where the fused polymer build particles end and the adjacent polymer build particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the three-dimensional object), the detailing agent can be applied to these areas If the detailing agent is used, the fusing agent and detailing agent can be jetted onto the powder bed using fluid jet print heads. The amount of the fusing agent used can be calibrated based the concentration of radiation absorber in the fusing agent, the level of fusing desired for the polymer build particles, and other factors. In one example, if the layers of powder bed material is x microns thickness, e.g., x=100 µm, then the fusing agent can penetrate x microns into the powder bed material. Thus, the fusing agent can heat the powder bed material throughout the layer so that the layer can coalesce and bond to the layer below. After forming a solid layer, a new layer of loose powder can be formed, either by lowering the powder bed or by raising the height of a powder roller and rolling a new layer of powder.

In some examples, the powder bed can be preheated to a temperature below the melting or softening point of the polymer build particles. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer build particles can include polyamide 12 polymer. In another example, the preheat temperature can be about 90° C. to about 100° C. and the polymer build particles can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing agent leaving the unprinted portions of the powder bed material below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer build particles with the fusing agent printed thereon, while the unprinted polymer build particles do not absorb as much light and remain at a lower temperature.

Depending on the amount of radiation absorber present in the powder bed material, the absorbance of the radiation absorber, the preheat temperature, and the melting or softening point of the polymer, an appropriate amount of irradiation can be supplied from the fusing lamp. In some examples, the fusing lamp can irradiate each layer from about 0.5 to about 10 seconds per pass.

The three-dimensional printed object can be formed by jetting a fusing agent onto layers of powder bed material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with detailing agent. In other examples, the object can be defined by a first three-dimensional object model a second three-dimensional object model can define areas to jet the detailing agent. In further examples, the jetting of the detailing agent may not be controlled using a three-dimensional object model, but using some other parameters or instructions to the three-dimensional printing system. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of powder bed material.

In an example of the three-dimensional printing process, a thin layer of powder bed material can be spread on a bed to form a powder bed. At the beginning of the process, the powder bed can be empty because no polymer build particles have been spread at that point. For the first layer, the polymer build particles can be spread onto an empty build platform. The build platform can be a flat surface made of a material sufficient to withstand the heating conditions of the three-dimensional printing process, such as a metal. Thus, "applying individual powder bed material layers of polymer build particles to a powder bed" includes spreading polymer build particles onto the empty build platform for the first layer. In other examples, a number of initial layers of powder bed material can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of powder bed material can be spread over the powder bed and the process can be repeated to form additional layers until a complete three-dimensional object is printed. Thus, "applying individual powder bed material layers of polymer build particles to a powder bed" also includes spreading layers of powder bed material over the loose particles and fused layers beneath the new layer of polymer particles.

Systems for Three-Dimensional Printing

Figure 5:
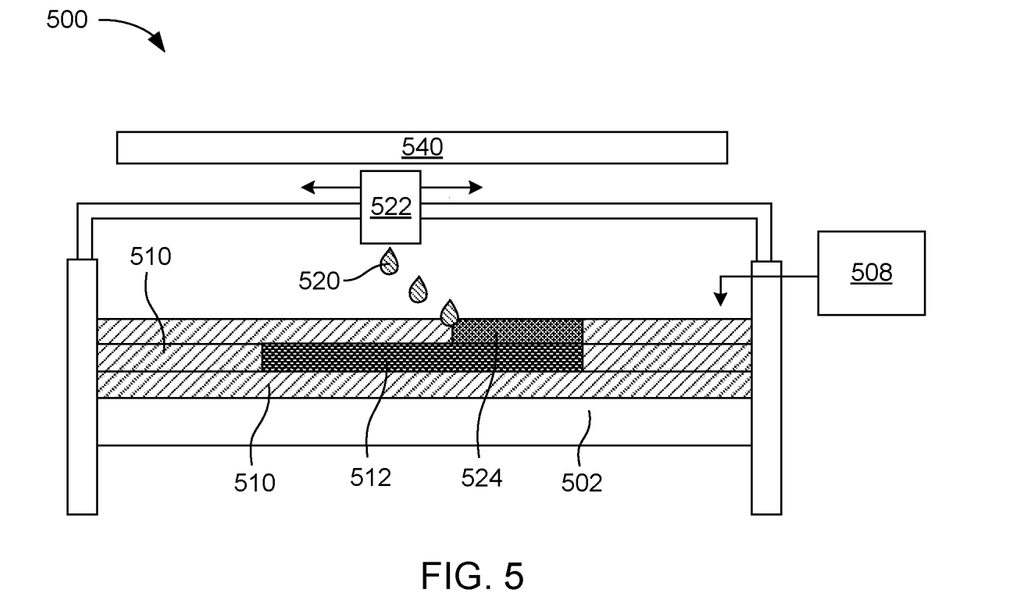
FIG. 5 is a schematic view of an example system for three-dimensional printing in accordance with the present disclosure.

The present disclosure also extends to systems for three-dimensional printing. FIG. 5 shows an example system 500 for three-dimensional printing in accordance with the present disclosure. The system includes a build platform 502. Powder bed material 510 can be deposited onto the build platform by a powder bed material applicator 508 where the powder bed material can be flattened or smoothed, such as by a mechanical roller or other flattening technique. This can form a flat layer of powder bed material. The fusing agent 520 can then be applied to an upper layer 524 using a fluid ejector 522. Not shown in this FIG., but a detailing agent or other fluids, e.g., a coloring agent, can likewise be used in some examples. The upper layer where the fusing agent is applied can correspond to a layer or slice of a three-dimensional object model. The system can also include a radiant energy source 540 that can apply heat to the layers of powder bed material and fusing agent that has been applied. In this particular example, the system includes a radiant energy source that can irradiate the entire powder bed at once instead of a moveable radiant energy source (as shown previously in FIGS. 3A-3C). The radiant energy source can heat the powder bed material and fusing agent until the powder bed material on which the fusing agent was printed reaches a melting or softening point temperature of the powder bed material. The polymer particles can fuse together to form a solid polymer matrix 512 upon application of the electromagnetic energy from the radiant energy source. In this figure, one layer of solid polymer matrix has already been formed and then a layer of additional powder bed material has been spread over the top of the solid layer. The figure shows the fusing agent being applied to the additional layer, which can then subsequently bed heated and fused to add another solid layer to the three-dimensional printed object.

In further examples, the system can include a heater positioned along a side(s) of the powder bed material, beneath the powder bed material, or a combination of these locations. For example, in some instances, the support bed can include an additional integrated heater to heat the powder bed material from below to maintain a more uniform temperature in the powder bed. The radiant energy source can be used to heat the areas of the powder bed where fusing agent has been applied to fuse the polymer particles in those areas. In certain examples, the radiant energy source heater can include a heat lamp, infrared heater, halogen lamp, fluorescent lamp, or other type of radiant energy source. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. Additional ejectors may also be included to eject other fluid, as may be indicated for a specific application.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum. The term "dye" is also used in connection with certain electromagnetic radiation absorbers contained in the fusing agents of the present disclosure.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "applying" when referring to fusing agent and/or detailing, for example, refers to any technology that can be used to put or place the respective fluid agent on or into a layer of powder bed material for forming three-dimensional objects. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture, for example. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "D50 particle size" refers to a number median of the diameter of the particles for spherical particles, or a number median of the volume equivalent sphere diameter for non-spherical particles. The volume equivalent sphere diameter is the diameter of a sphere having the same volume as the particle. D50 particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein. Ranges that use the term "about" are supportive of providing this flexibility, but also support the numeric ranges provided as if the term "about" were removed. In other words, ranges with about include both the range flexibility provided by the term about and the slightly narrower numeric range interpreted be the numeric range without the term "about" included.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if each numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Preparation of Powder Bed Materials

Various powder bed materials were prepared using the components as described in Table 1. Some of the powder materials were prepared as blends of polyamide particles and cellulose particles. The polyamide particles selected for use included a polyamide co-polymer, and the D50 particle size was about 50-70 µm. The cellulose particles used were selected from either ultrafine cellulose (UFC) particles or cellulose nanocrystal (CNC) particles described herein. The blending was carried out in an acoustic mixer. The loading of the cellulose particles was at 6 wt % or 12 wt %, based on the total weight of the powder bed material. In further detail, a comparative powder bed material was prepared that was not modified with cellulose particles, e.g., 0 wt % cellulose particles.

TABLE 1

Powder Bed Material (PBM) Formulations

| Powder Bed Material ID | Polyamide Copolymer (wt %) | UFC (wt %) | CNC (wt %) |
|---|---|---|---|
| PBM 1 | 94 | 0 | 6 |
| PBM 2 | 94 | 6 | 0 |
| PBM 3 | 88 | 12 | 0 |
| PBM C (Comparative) | 100 | 0 | 0 |

Example 2—Printing Three-Dimensional Objects

Three-dimensional printed objects were prepared in the shape of dogbones (or barbells) using a common fusing agent and set of printing conditions, varying only the powder bed materials which were prepared in accordance with Example 1, Table 1. The three-dimensional printed objects were printed using multi-jet fusion (MJF) printers, and in accordance with the systems and methods described in the present disclosure (except for the comparative examples, which did not use cellulose additives). Essentially, the same fusing agent was iteratively jetted layer-by-layer on the powder bed material, which was used in combination with an electromagnetic energy source, to selectively form multiple fused layers, resulting in the three-dimensional printed objects.

The dogbone objects were formed with an elongated middle section flanked by two end sections that were formed having a larger size, so that the middle section was the structurally weakest section to test for stiffness and other mechanical properties. The middle section was formed with a cross-sectional direction dimensions of about 6 mm×2 mm in cross-sectional diameter (perpendicular to the length of the middle section). The end sections were formed with the dimensions of about 25 mm×2 mm. The various samples were evaluated for stiffness (Young's Modulus), which is measured in megapascals (MPa). In some tests, the samples were also measured for ultimate tensile strength (UTS), also measured in MPa, as well as elongation at break (EaB), reported as a percentage of elongation when the narrow middle section broke when stretched. The testing was performed by gripping the end sections of the dogbone objects and providing stress or force in related the pulling apart of the two ends and stressing the middle portion. Measurements were taken related to stiffness, and in some cases tensile strength and elongation at break. The dogbone objects were tested by manual pulling using an Instron tensiometer at a pull rate of 500 mm per minute.

Example 3—Stiffness, Strength, and Elongation Comparisons

Figure 6:
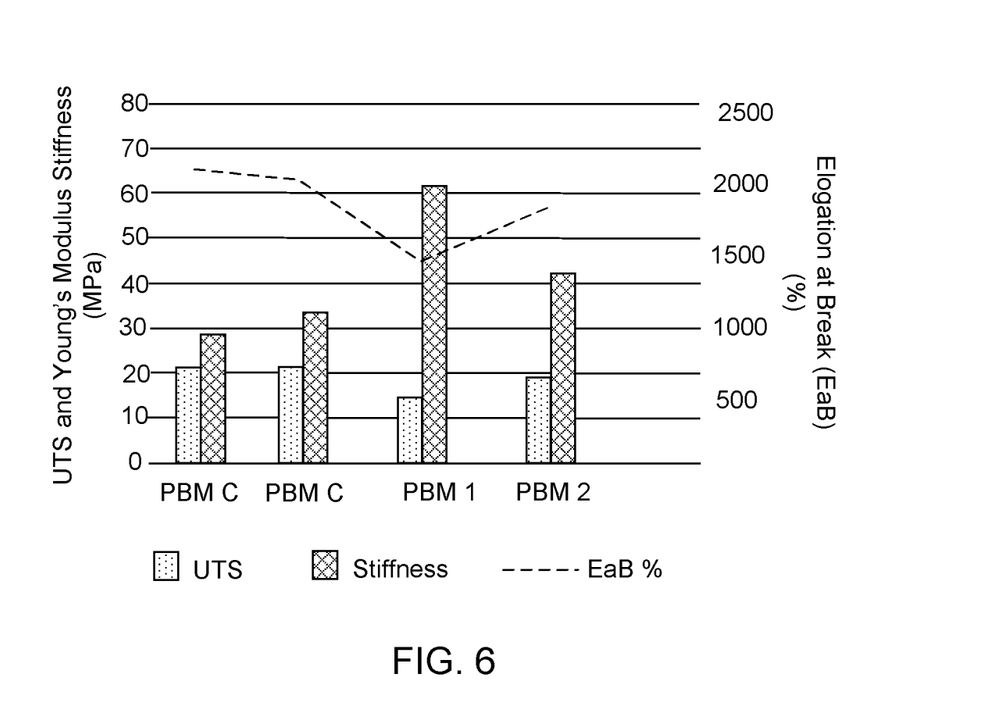
FIGS. 6-8 are charts illustrating example test results related to stiffness and other properties of three-dimensional printed objects in accordance with the present disclosure.

Three different metrics were used to evaluate PBM C (Comparative examples with 100 wt % polyamide particles) against PBM 1 to PBM 2 (6 wt % CNC or UFC cellulose particles). As can be seen in FIG. 6, the collected data demonstrates that dogbone objects with either CNC or UFC particles had an increase in Young's Modulus stiffness as compared to dogbone objects that were printed with no cellulose particles. The data depicted in FIG. 6 also demonstrates that a percentage of elongation to break decreased for dogbone objects printed with UFC and CNC particles as compared to dog bone objects printed without cellulose particles. However, it is noted that with the CNC particles, the stiffness increase was significant. On the other hand, though the UFC particles did not increase the stiffness significantly, the reduction in ultimate tensile strength and elongation at break was relatively minimal compared to the increase in stiffness. Thus, from this data at 6 wt % cellulose, it appears that CNC may enhance stiffness more than UFC, but the UFC may provide a more balanced improvement in stiffness without sacrificing significantly in ultimate tensile strength and elongation at break values.

Figure 7:
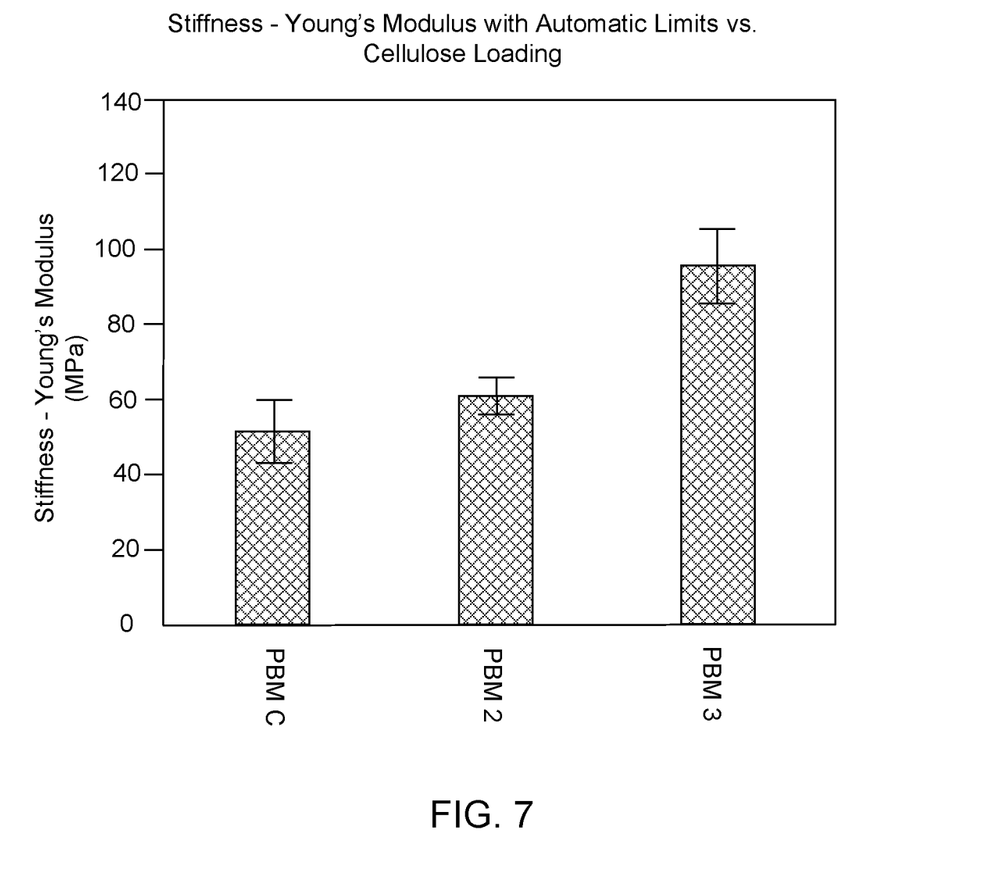

With respect to the data collected as shown in FIG. 7, UFC particles were particularly evaluated for enhancing stiffness with respect to fresh powder bed material. Specifically, comparative samples PBM C (0 wt % cellulose particles) were compared against PBM 2 and PBM 3. PBM 2 included 6 wt % UFC particles and PBM 3 included 12 wt % UFC particles. The collected data demonstrates that a powder bed material with a 12 wt % of UFC was used to generate a dogbone printed object as described in Example 2 with nearly a two-fold increase in Young's Modulus stiffness compared to a dogbone object prepared without cellulose particles.

Figure 8:
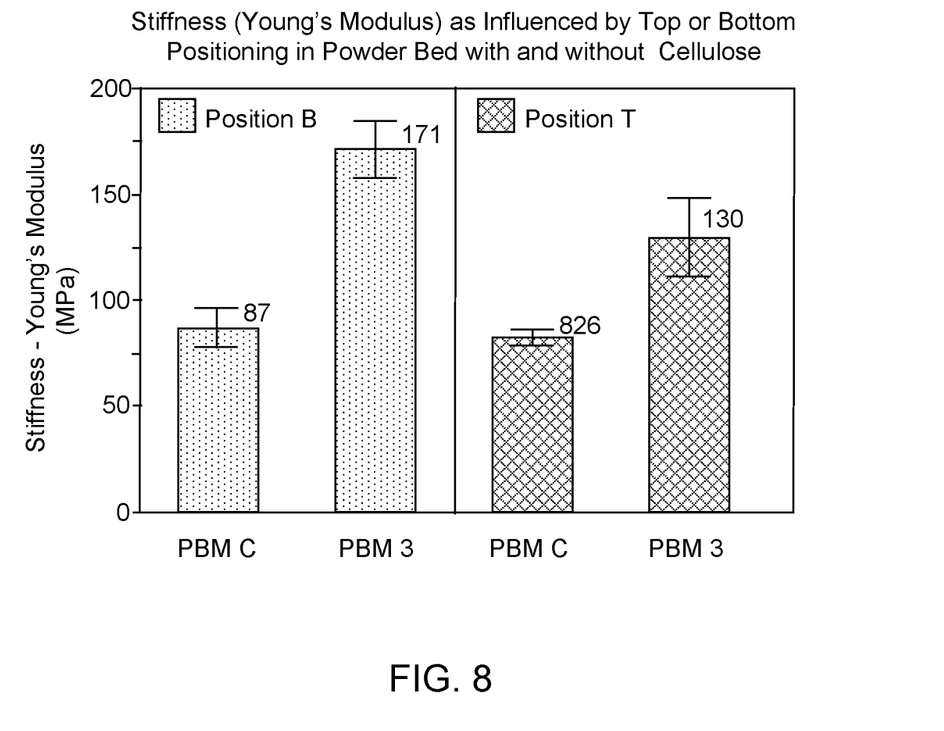

Referring not to FIG. 8, two dogbone objects prepared in accordance with Example 2 were prepared using a powder bed material with 0 wt % cellulose (PBM C) or a powder bed material with 12 wt % UFC particles (PBM 3). In this example, some dog bone objects were printed on the bottom of the powder bed, meaning the object spent more time in the powder bed during the printing process (deeper in the powder bed). Those dogbone objects are labeled in FIG. 8 as being prepared at the bottom, or "Position B." Another portion of the dogbone objects were printed at the top of the powder bed, meaning the object spent less time in the powder bed during the printing process (shallow positioning in the powder bed). Those dogbone objects are labeled in FIG. 8 as being prepared at the top, or "Position T." The collected data in this FIG. demonstrates that a dogbone object with a powder bed material with a 12 wt % of UFC had an increase in Young's Modulus as compared to a dogbone object with no cellulose particles, whether printed at Position B or Position T. However, in both instances, the stiffness was greater for objects printed at Position B, likely because they were exposed to heat for a longer period of time. Notably, however, the dogbone with the 12 wt % UFC particles at position T were still significantly greater in stiffness than the dogbone prepared without cellulose particles at Position B.

What is claimed is:

1. A three-dimensional printing kit, comprising:
   a powder bed material comprising polymer build particles and cellulose nanocrystal particles, wherein the cellulose nanocrystal particles are chemically and thermally stable at a melting point temperature of the polymer build particles, have a D50 particle size of from about 100 nm to about 1 μm, and are present in an amount ranging from 12 wt % to about 20 wt % based on a total weight of the powder bed material; and
   a fusing agent to selectively apply to the powder bed material, wherein the fusing agent comprises water and a radiation absorber to absorb radiation energy and convert the radiation energy to heat.

2. The three-dimensional printing kit of claim 1, wherein the cellulose nanocrystal particles have an average aspect ratio of from about 2:1 to about 500:1.

3. The three-dimensional printing kit of claim 1, wherein the polymer build particles have an average aspect ratio of from 1:1 to about 1.5:1 and a D50 particle size of from about 5 μm to about 150 μm.

4. The three-dimensional printing kit of claim 1, wherein the polymer build particles include a polyamide co-polymer.

5. The three-dimensional printing kit of claim 1, wherein the polymer build particles are present in the powder bed material in an amount of from about 60 wt % to about 97 wt % based on the total weight of the powder bed material.

6. The three-dimensional printing kit of claim 1, wherein the melting point temperature of the polymer build particles ranges from about 70° C. to about 350° C.

7. The three-dimensional printing kit of claim 1, wherein the radiation absorber is selected from the group consisting of a metal dithiolene complex, carbon black, a near-infrared absorbing dye, a near-infrared absorbing pigment, metal nanoparticles, a conjugated polymer, and a combination thereof.

8. The three-dimensional printing kit of claim 1, wherein the polymer build particles are selected from the group consisting of polyamide 6 particles, polyamide 9 particles, polyamide 11 particles, multipurpose polyamide 12 (MP PA-12) particles, polyamide 66 particles, polyamide 612 particles, thermoplastic polyamide (TPA) particles, polyamide copolymer particles, polyethylene particles, thermoplastic polyurethane particles, polypropylene particles, polyester particles, polycarbonate particles, polyether ketone particles, polyacrylate particles, polystyrene particles, wax particles, and a combination thereof.

9. The three-dimensional printing kit of claim 1, further comprising a detailing agent comprising a detailing compound, wherein the detailing compound reduces the temperature of powder bed material onto which the detailing agent is applied.

10. The three-dimensional printing kit of claim 1, wherein the cellulose nanocrystal particles have an average aspect ratio of from about 300:1 to about 500:1.

11. The three-dimensional printing kit of claim 1, wherein the polymer build particles are polyamide copolymer particles present in the powder bed material in an amount ranging from about 60 wt % to 80 wt %, based on the total weight of the powder bed material.

12. A method of making a three-dimensional printed object, comprising:
   iteratively applying individual layers of a powder bed material to a powder bed, wherein the powder bed material comprises polymer build particles and cellulose nanocrystal particles, wherein the cellulose nanocrystal particles are chemically and thermally stable at a melting point temperature of the polymer build particles, have a D50 particle size of from about 100 nm to about 1 μm, and are present in an amount ranging from 12 wt % to about 20 wt % based on a total weight of the powder bed material;
   based on a three-dimensional object model, selectively applying a fusing agent onto the individual layers of the powder bed material, wherein the fusing agent comprises water and a radiation absorber, and wherein the radiation absorber absorbs radiation energy and converts the radiation energy to heat; and
   exposing the powder bed to radiation energy to selectively fuse the polymer build particles in contact with the radiation absorber at individual layers and form the three-dimensional printed object.

13. The method of claim 12, further comprising blending the powder bed material by mixing the polymer build particles with the cellulose particles using an acoustic mixer.

14. A system for three-dimensional printing, comprising:
   a powder bed material comprising polymer build particles and cellulose nanocrystal particles, wherein the cellulose nanocrystal particles are chemically and thermally stable at a melting point temperature of the polymer build particles, have a D50 particle size of from about 100 nm to about 1 μm, and are present in an amount ranging from 12 wt % to about 20 wt % based on a total weight of the powder bed material;
   a fusing agent to be applied onto a layer of the powder bed material, wherein the fusing agent comprises water and a radiation absorber, wherein the radiation absorber is to absorb radiation energy and convert the radiation energy to heat; and a radiant energy source positioned to expose the layer of the powder bed material to radiation energy to selectively fuse the polymer build particles in contact with the radiation absorber and thereby form a three-dimensional printed object.

* * * * *